United States Patent [19]

Browning

[11] Patent Number: 4,883,918

[45] Date of Patent: Nov. 28, 1989

[54] TRANSFORMER MOUNTING PAD HAVING A CABLE OPENING LINED WITH A SAFETY BARRIER

[75] Inventor: Robert L. Browning, De Kalb County, Ga.

[73] Assignee: Formex Manufacturing, Inc., Norcross, Ga.

[21] Appl. No.: 340,663

[22] Filed: Apr. 20, 1989

[51] Int. Cl.[4] .................. H01B 5/00; H01F 15/02; F16M 5/00

[52] U.S. Cl. ........................ 174/1; 248/346; 248/678; 336/65

[58] Field of Search ............... 174/1, 38; 336/65; 248/346, 678, 679; 220/3.92, 3.94, 4 F, 22.3, 84; 229/120.36

[56] References Cited

U.S. PATENT DOCUMENTS

| 2,854,724 | 10/1958 | Wuorio | 220/4 F |
| 3,109,420 | 11/1963 | Ott et al. | 220/4 F X |
| 4,023,755 | 5/1977 | Alesi, Jr. | 336/65 X |
| 4,050,659 | 9/1977 | McCannon et al. | 336/65 X |
| 4,213,111 | 7/1980 | Lux, Jr. | 336/65 |
| 4,267,399 | 5/1981 | Lux, Jr. | 174/1 |

FOREIGN PATENT DOCUMENTS 24344 5/1906 Austria .............................. 220/4 F Primary Examiner—Laramie E. Askin
Attorney, Agent, or Firm—Patrick F. Henry, Sr.

[57] ABSTRACT

A detachable safety frame is constructed from four individual members which are assembled into a rectangular frame detachably attached at each respective adjacent and adjoining end. The frame is assembled into either existing cable openings of installed transformer and mounting pad installations or may be incorporated into new installations during the installation of the transformer on the mounting pad. In the version used for new installation, the individual frame members are of such size as to extend downwardly into the hole in the ground which is dug for the cables. Each end of each member is provided with a projecting tab and slot for engagement and disengagement to assemble or disassemble the frame.

9 Claims, 2 Drawing Sheets

TRANSFORMER MOUNTING PAD HAVING A CABLE OPENING LINED WITH A SAFETY BARRIER

The field of this invention is protection for transformer installations and particularly a continuous wall or barrier installed around the cable opening to a transformer mounting pad for the purpose of preventing the improper insertion of devices such as metal wires and rods between the transformer and the pad, and also to provide some additional stability to prevent the transformer from sliding off the pad.

BACKGROUND OF THE INVENTION

Heavy transformers are supported on transformer pads and one type of pad is disclosed in U.S. Pat. No. 4,023,755 in which the structural support for the load created by the weight of the transformer is provided by a wood and foam core enclosed within a plastic shell. An aperture is formed through the structure and cables from the transformer are lead down into the ground to the source of electricity. There have been instances in the past where a child pushed a piece of wire, similar to a coat hanger, under the transformer and managed to make contact with a high voltage conductor. There have been previous attempts to provide a perimeter barrier around the transformer pad opening and one such device is disclosed in U.S. Pat. No. 4,267,399 and comprises a molded rectangular frame of solid construction which is to be inserted in the transformer opening before the installation of the transformer is completed on the pad. One problem with the solid frame is that it cannot be installed into an existing unit (which is sometimes referred to as "retrofitting") without disconnecting all the cables, and this creates a safety hazard. In addition, the prior frame does not extend below the mounting pad for additional protection. There is a demand for a safety barrier which can be installed after the transformer has been installed on the pad and without disconnecting or removing the cables. There is also a need for a unit which can be disassembled and assembled into any old or new installations. This is particularly important for retrofit.

SUMMARY OF THE INVENTION

The present safety barrier offers extra protection by having an additional two inch high lip sticking out of the cable entrance opening thereby creating an extra wall around the electrical cables for extra protection. Also, the present retrofit unit installs on existing transformers without disassembling the transformer cables and parts. Most transformers are extremely crowded and have a large number of high voltage cables inside which makes one version of the present device a definite advantage because it can be installed in a matter of minutes without having to disconnect all of the cables and it can fit into a very tight area.

It is noted that the electrical companies for safety purposes always disconnect at least one of the major input leads as a safety precaution.

The present device for new installation of transformers provides several additional features that are not available in the retrofit unit version, such as being able to tie the transformer and the mounting pad to the ground by extending the device for new installation approximately 18 inches below the mounting pad, whereas the retrofit unit version does not extend below the pad but does extend above the same, as in the new installation version. In the new installation, the power company crew digs a hole around the prelaid cables and the shield fits in the hole around the cables. Thus, the new installation provides protection from the cables and also provides additional tamper protection safety for the transformer for creating an additional wall around the cables in case the earth under the transformer is washed out from either rain, erosion or abuse. The new installation unit also actually interlocks onto the mounting pad to help tie the unit and mounting pad together as one unit and also interlocks unto itself making a strong unit and providing the same features as the retrofit unit. The new installation unit is designed to be attached to the mounting pad before it is put in place and before a tansformer is placed on the pad.

The present invention comprises a plurality of panels which are installed and interlocked together at each corner to provide a safety barrier around the opening of new or old transformer pad installations. The individual members of the new construction are of more surface area and extend further into the ground for additional protection.

BRIEF DESCRIPTION OF THE DRAWINGS

Other and further objects and advantages of this invention will become apparent upon reading the following specification of the preferred embodiment taken in conjunction with the accompanying drawings, in which.

DESCRIPTION OF A PREFERRED EMBODIMENT

Further details of the transformer mounting pad 10 itself are shown in U.S. Pat. No. 4,023,755 and pad 10 has a cable opening 12 provided with recesses 14 with metal inserts 16. The particular opening 12 in the particular transformer pad 10 is rectangular in construction and this is the usual situation but of course the opening could be square and therefore still a quadrilateral.

Figure 1:
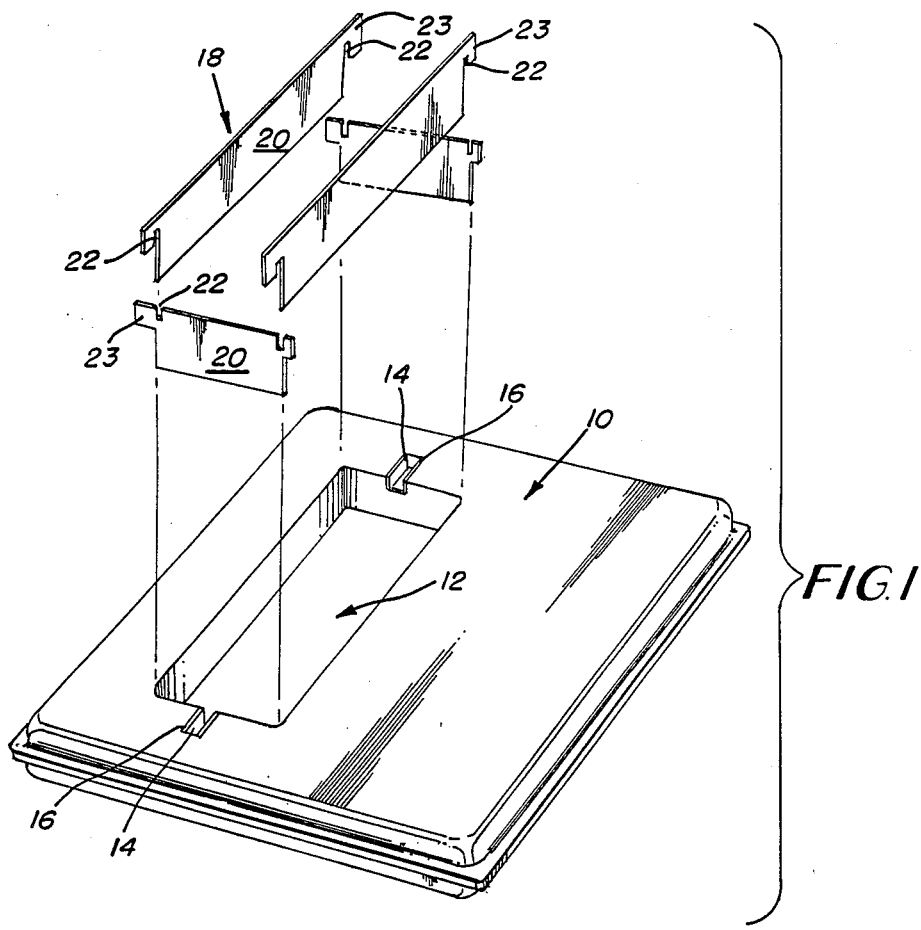
FIG. 1 is a perspective view of the retrofit (transformer already on the pad) installation showing the interlocked perimeter system in position for the installation as a rectangular barrier in the cable opening.
Figure 4:
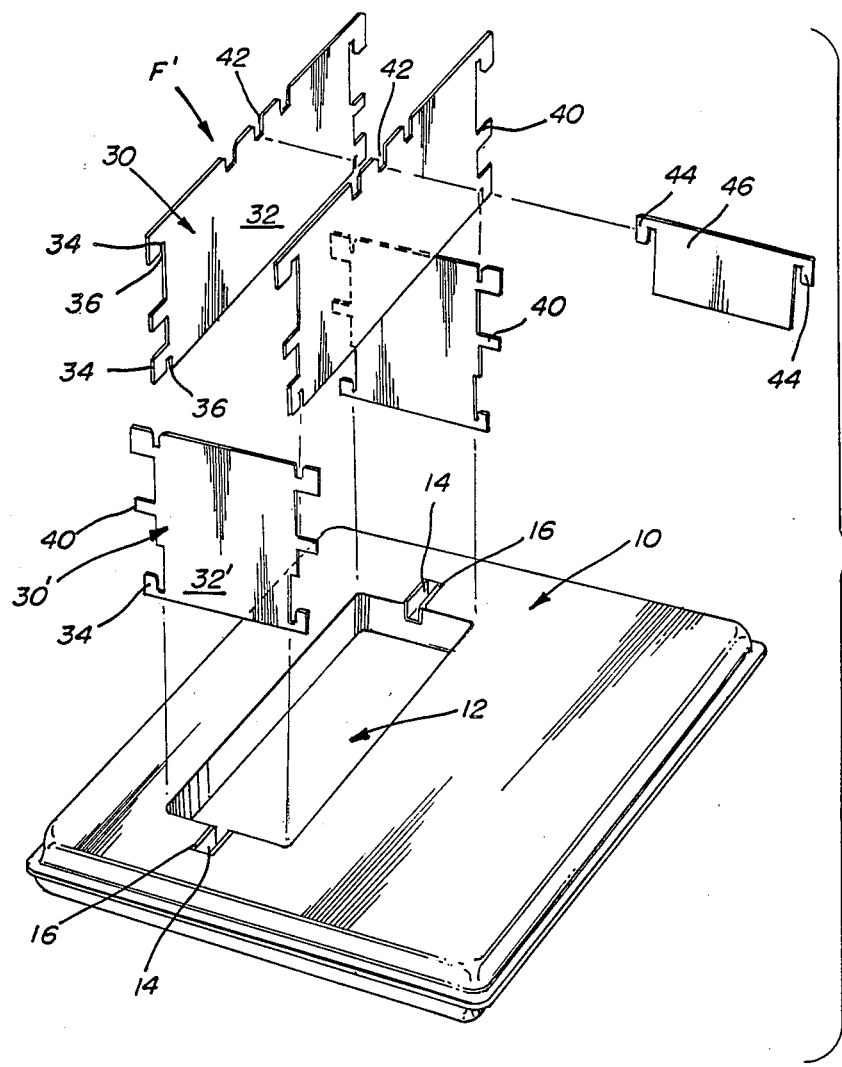
FIG. 4 is a perspective view of a new installation (transformer being installed on the pad) showing the individual panels in position for installation in the cable opening.

The difference between the safety barrier shown in FIGS. 1 and 4 is primarily the size of the individual panels.

Figure 2:
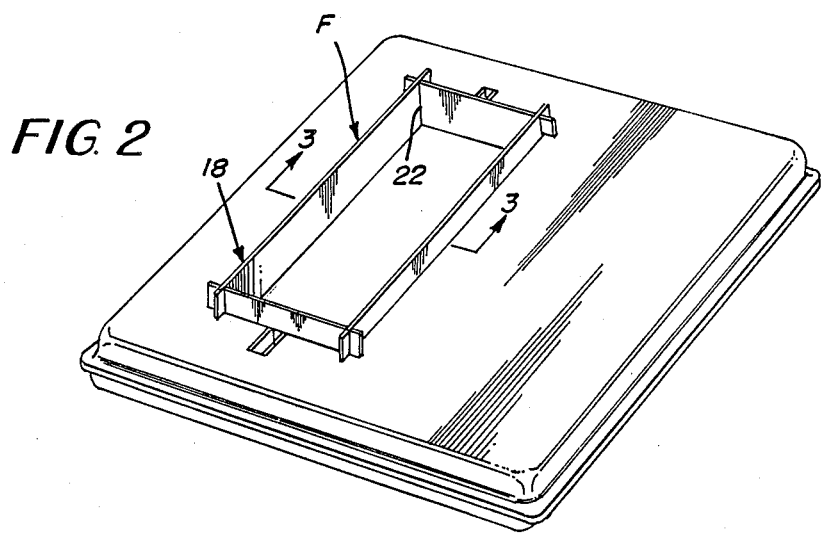
FIG. 2 is a perspective view similar to FIG. 1 with the rectangular barrier installed in place on the transformer mounting pad and the cable opening.

With reference to FIGS. 1 and 2, in the retrofit system frame F for existing installations, four individual linear panels 18 each comprises a flat panel surface 20 and each has on each end thereof a slot 22 which is fitted onto the appropriate projecting end tab 23 on the end of each panel 18. Thus, the frame F provided by the assembly of the panels 18 as shown in FIGS. 1 and 2 comprises a plurality of individual members 18 which may be disassembled and stacked together and thereafter assembled into the rectangular system shown in FIGS. 1, 2 and 3. The panels 18 may be molded from plastic such as polyethyelene.

Figure 3:
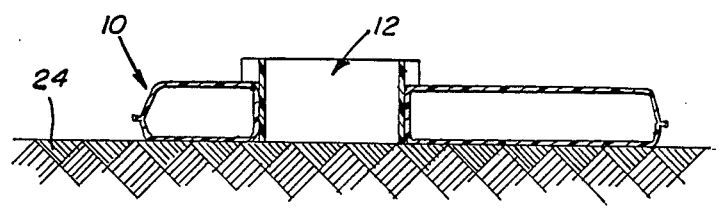
FIG. 3 is a cross-sectional view, taken along lines 3—3 in FIG. 2, showing a retrofit installation of the barrier in FIGS. 1 and 2 installed in the cable opening and extending above the transformer mounting pad.

In FIG. 3 there is disclosed an installation on the ground 24 of pad 10 having opening 12 into which is fitted the rectangular frame F which is constructed from the four side members 18. The installation in FIG. 3 does not extend, for example, approximately 18 inches below the mounting pad 10 and this retrofit unit in FIGS. 1, 2 and 3 is usually about the same thickness as the mounting pad 10 but extends (e.g. 2 inches) above pad 10.

Figure 5:
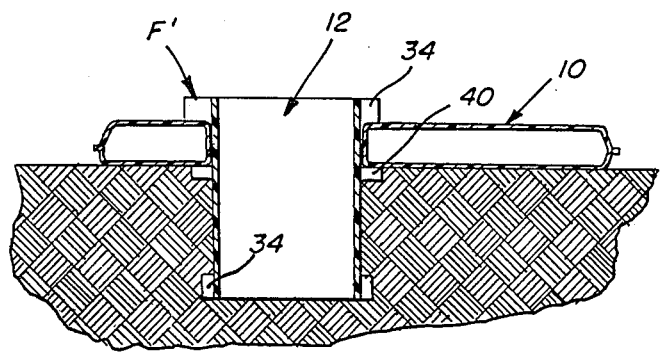
FIG. 5 is a cross-sectional view of a typical transformer mounting pad shown in FIG. 4 installed on the ground as new construction.

In a new installation shown in FIGS. 4 and 5, the power company crew digs a hole around the pre-laid cables and a new unit is assembled and fitted into the hole around the cables. The new installation unit is a frame F' which provides protection for the cables and provides additional tamper protection (safety) for the transformer by creating an additional wall around the cables in case the earth under the transformer gets washed out from rain or the like. Frame F' comprises two flat side panels 30 and two flat end panels 30' having sides 32 and 32', respectively; and the ends of each panel 30, 30' each has a tab 34 defining a slot 36, and there is a tab 34 and slot 36 on the bottom and the top, the same as in the FIG. 1 embodiment. In the version in FIGS. 4 and 5 the side panels 30 are larger than the end panels 30', but that is the only difference. Each panel 30, 30' also has an intermediate tab 40. Side panels 30 each has notches or slots 42 receiving the tabs 44 of an intermediate panel 46 which has slots next to the tabs 44 whereby panel 46 may be detachably placed in slots 42 on side panels 30 to act as a divider panel.

While there is shown a preferred embodiment and an alternative form of the present invention, there is for purpose of illustration only and does not constitute any sort of limitation on the score of the invention because there are various alterations, changes and deviations which may be made without departing from the scope of the invention as defined only by the proper interpretation of the appended claims.

I claim:

1. A transformer mounting pad having a cable opening extending therethrough and a safety wall system installed in the cable opening, said safety wall system comprising
   a frame positioned in said cable opening and extending from above said opening through the opening along the sides thereof, said frame comprising four detachable and removable individual wall members detachably attached together at respective adjacent ends, and attaching means on each of said wall members detachably attaching said members together.

2. The assembly claimed in claim 1, wherein: said attaching means comprises a slot on each end of each of said wall members.

3. The assembly claimed in claim 2, wherein: each wall member has a tab on each end thereof adjacent said slot.

4. The assembly claimed in claim 3, wherein: each wall member has a top and a bottom and the tabs on the top and bottom of two opposite wall members project in the same direction towards the bottom.

5. The assembly claimed in claim 1, wherein: said wall members extend into said cable opening below the level of the bottom surface of the mounting pad.

6. The assembly claimed in claim 5 wherein: each end of each wall member has an intermediate tab projecting therefrom.

7. The assembly claimed in claim 1, wherein: there are respective support members extending from each of said wall members beneath said transformer mounting pad.

8. The assembly claimed in claim 1, wherein: there is an intermediate member detachably positioned between the ends of two opposite said wall members.

9. The assembly claimed in claim 8, wherein: said intermediate member has a tab and a slot on each end and there are slots in said two opposite wall members to receive said slots on said intermediate member.

* * * * *